United States Patent Office 3,299,185
Patented Jan. 17, 1967

3,299,185
DYEABLE POLYOLEFIN FIBERS CONTAINING A BINARY COPOLYMER OF STYRENE AND ACRYLONITRILE
Ryohei Oda, Kyoto, and Norihisa Takeda and Shiro Ueki, Fukushima-ken, Japan, assignors, by mesne assignments, to Ube-Nitto Kasei Co., Ltd., Chuo-ku, Tokyo, Japan, a corporation of Japan
No Drawing. Filed July 30, 1963, Ser. No. 298,546
Claims priority, application Japan, Sept. 27, 1962, 37/41,377
2 Claims. (Cl. 260—897)

This invention relates to readily dyeable polyolefine fibers and to methods for manufacturing the same. More particularly this invention relates to fibers which consist essentially of polyolefine and which are modified by blending with a copolymer of vinyl compounds to improve their dyeability.

In order to improve the principal drawbacks of polyolefine fibers including staple fibers, filaments, yarns, cord and the like, several methods have been proposed. None of them, however, has been satisfactory due to disadvantages caused by these methods. Accordingly the problem of how to improve the dyeability of polypropylene fibers required solution before the widespread use warranted by their other excellent physical properties could be realized.

The inventors of the present invention have solved this problem by the method hereinafter described.

The object of this invention is to provide polyolefine fibers with receptivity to dyestuffs by blending a copolymer of vinyl compounds which are fusible with the said polyolefine without affecting the mechanical properties of the polyolefine.

The further object of this invention is to improve their appearance especially to afford them delustering effect without employing common delustering agents.

As the polymer to be blended, styrene-acrylonitrile binary copolymer or ternary copolymer is employed. The latter contains monomer units of a polar vinyl compound as the third component in addition to the styrene and acrylonitrile monomers. When a copolymer of styrene and acrylonitrile is used for blending, it is preferable to make the mol ratio of styrene and acrylonitrile in the polymer between 95 to 50 and 5 to 50, respectively. When a ternary copolymer of styrene, acrylonitrile and a polar vinyl monomer is used for blending, it is preferable to make the mol ratio of styrene and acrylonitrile plus polar vinyl compound between 95 to 50 and 5 to 50 respectively, the mol proportion of acrylonitrile being larger than that of the polar vinyl compound. The polar vinyl compounds used as the third component include vinyl pyridine, vinyl pyrrolidone, acrylamide, acrylates, itaconic caid, maleic anhydride, maleimide, allylamine, sodium allylsulfonate, sodium metallylsulfonate, butadiene and the like.

The preferred amount of the binary copolymer of styrene or the acrylonitrile, and ternary copolymer of styrene, acrylonitrile and polar vinyl compound, to be blended according to the method of this invention is from 1 to 20 percent of the polyolefine. An amount less than 1 percent does not improve the dyeability, while an amount more than 20 percent suddenly deteriorates the mechanical properties of the fiber obtained.

For example when the percentage of the blending polymer was 0.5 percent, dye receptivity was only 0.5 percent at the highest, and accordingly the resultant fiber had no practical value, but when the percentage of the blending polymer was increased to more than 1 percent dye receptivity was better than 0.8 percent and the resultant fiber had practical value. Dye receptivity of an unmodified polypropylene fiber was 0.3 percent.

When the blending percentage was more than 20 percent, heat resistance and shrinkage by heat became very large. For example shrinkage reached 20 percent at 130° C. for 20 minutes and elongation became more than 100 percent. The fiber lost its practical value.

The spinning of blended polyolefine may be effected by any kind of melt-spinning apparatus commonly used. It is possible to mix the blending polymer in chip form with chips of polyolefine in desired amount and use the mixture of different kind of chips directly for spinning. Alternatively it is also possible to fuse the two components together, shape into chips containing both components in each chip and use these for melt spinning. The modified polyolefine fibers thus obtained possess excellent receptivity to various kinds of dispersing dyestuffs.

Fibers obtained by blending a homopolymer of styrene with the polyolefine do not have sufficient receptivity to dispersing dyestuffs and the fastness of the material dyed is poor. It is impossible to blend the polyolefine with a homopolymer of acrylonitrile and to spin because of the inferior heat stability of the latter. Besides the homopolymer of acrylonitrile has weak affinity to dispersing dyestuffs.

It is notable and the most significant feature of this invention that polyolefine fibers having very superior receptivity to dispersing dyestuffs and very excellent fastness can be obtained by blending the polyolefine with a binary copolymer of styrene and acrylonitrile or ternary copolymer containing the third component, as additive to the above binary copolymer.

The role of the third component, polar vinyl compound, additionally used for the ternary copolymer is not merely to afford cumulative receptivity to reacting dyestuffs corresponding to each homopolymer or binary copolymer but to afford far better dyeability to dispersing dyestuffs, as compared with the polyolefine fibers blended with binary copolymer of styrene and acrylonitrile.

The following examples illustrate embodiments of the method of this invention.

*Example 1*

The blending polymer was prepared in the following conditions; 70 mol percent of styrene monomer and 30 mol percent of acrylonitrile monomer were mixed with one percent of benzoyl peroxide (B.P.O.) and polymerization was performed at the temperature of 60° C. for 3 hours. The resultant polymer was composed of 63 mol percent of styrene and 37 mol percent of acrylonitrile. 5 parts of this polymer and 95 parts of polypropylene were blended under fusion in a pelletizer at the temperature of 240° C. to form chips which were subjected to spinning in a melt spinning apparatus in the following conditions Fusion temperature _____ 270° C.
Stretch ratio at spinning _____ 200 times.
Drawing ratio after spinning _____ 6 times (95–98° C.).

The properties of the fiber obtained were as follows

Denier _____ d__ 1.16
Tenacity _____ g./d__ 8.44
Elongation _____ percent__ 29.6

The blended polypropylene fiber obtained according to this method had a remarkable dyeability to various dispersing dyestuffs which were available on the market. This fact is illustrated in the following table. The polystyrene-blended fiber in the table was obtained by melt spinning a blend of 95 parts polypropylene and 5 parts polystyrene similarly to the method as shown above.

| Fiber | Dyestuff | Receptivity, Percent |
|---|---|---|
| The fiber of the present invention | Latyl cerise B | 2.5 |
| The polypropylene fiber | do | 0.3 |
| The polystyrene blended fiber | do | 0.8 |

The fastness was measured as follows:

Fastness to sunlight (AATCC Standard Test Method) 4th grade

Fastness to laundry (AATCC No. 3) 4th grade

Example 2

10 parts of the polymer prepared according to Example 1 and 90 parts of polypropylene were fused together and subsequent shaping and spinning were also carried out as in Example 1. The mechanical properties of the resultant fiber were shown on the following table.

Denier _____ d__ 1.03
Tenacity _____ g./d__ 7.38
Elongation _____ percent__ 43.5

The receptivity of this fiber to dyestuffs was found to be better than that of Example 1 amounting to 3.0%. The various kinds of fastness measurement gave almost the same values as in Example 1.

Example 3

A blending polymer was prepared according to the following conditions; 70 mol percent of styrene monomer, 20 mol percent of acrylonitrile monomer, and 10 mol percent of vinylpyridine monomer were mixed with one percent of benzyl peroxide (B.P.O.) and polymerization was performed at the temperature of 60° C. for 3 hours.

The resultant polymer was a ternary copolymer of styrene, acrylonitrile, and vinyl pyridine. 5 parts of this polymer and 95 parts of polypropylene were spun according to the same condition as those of the Example 1. The fiber obtained showed almost similar mechanical properties as those in the Examples 1 and 2. The receptivity to dyestuffs was superior to that of the Example 1 but it was almost the same value with that of the Example 2. The improvement in fastness was appreciable, though the difference was not so much, comparing it to that of the Examples 1 and 2.

Example 4

The fibers obtained by spinning the blends consisting of 5 parts of styrene-acrylonitril-butadiene ternary copolymer (blending copolymer) and 95 parts of polyolefine at the same condition as in the Example 1 possessed the same receptivity to dyestuffs and the same mechanical properties as in the Example 3. The fastness was also equal to that of the Example 3.

Example 5

5 g. of readily dyeable polypropylene fiber obtained by the method described in Example 1 was treated at the temperature of 100° C. for 1 hour in the dyeing solution which was prepared by dispersing 0.2 g. of red dyestuff of the following formula, in 100 cc.

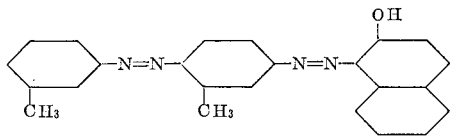

of water containing 0.3 g. of the dispersing agent of the formula:

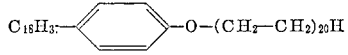

The fiber was then soaped and washed by water. The color of the dyed fiber was beautiful bright scarlet. The AATCC's light fastness was grade 5, the laundry fastness was grade 4, and the abrasion fastness was grade 4.

Example 6

Monofilaments produced by extruding a mixture of 95 parts of polyethylene and 5 parts of the blending polymer made by the method of Example 1 could be dyed a very deep color by employing various dispersing dyestuffs available on the market. The monofilament thus obtained showed hte following mechanical properties.

Strength _____ g./d__ 6.8
Elongation _____ percent__ 15
Denier _____ d__ 400

Example 7

The blending polymer was prepared by polymerizing the mixture composed of 70 mol percent of styrene monomer, 20 mol percent of acrylonitrile monomer and 10 percent of vinyl pyrrolidone monomer by use of 1 percent of benzoyl peroxide at the temperature of 60° C. for 8 hours. 5 parts of this polymer and 95 parts of polypropylene were blended and subjected to spinning as in Example 1. The resultant fiber showed the same behavior as the one obtained in Example 3.

What we claim is:

1. A process for the production of readily dyeable polyolefine fibers which comprises blending a polyolefine with a binary copolymer of styrene and acrylonitrile and melt-spinning the blended polymer.

2. A process according to claim 1 in which the amount of the binary copolymer of styrene and acrylonitrile is from 1 to 20 percent.

References Cited by the Examiner

UNITED STATES PATENTS

| 3,092,891 | 6/1963 | Baratti _____ 260—897 |
| 3,115,478 | 12/1963 | Guistiniani et al. ____ 260—897 |
| 3,137,989 | 6/1964 | Fior et al. _____ 260—897 |

MURRAY TILLMAN, *Primary Examiner.*

E. B. WOODRUFF, *Assistant Examiner.*